United States Patent [19]

Kawakami

[11] Patent Number: 5,363,260
[45] Date of Patent: Nov. 8, 1994

[54] MAGNETIC DISK APPARATUS AND METHOD FOR MANUFACTURING THE SAME

[75] Inventor: Yoshiyuki Kawakami, Tokyo, Japan

[73] Assignee: Kabushiki Kaisha Toshiba, Kawasaki, Japan

[21] Appl. No.: 84,435

[22] Filed: Jul. 1, 1993

Related U.S. Application Data

[63] Continuation of Ser. No. 753,082, Aug. 30, 1991, abandoned.

[30] Foreign Application Priority Data

Aug. 31, 1990 [JP] Japan ................. 2-90703[U]

[51] Int. Cl.5 .............................................. G11B 17/00
[52] U.S. Cl. ..................................... 360/97.01; 360/106
[58] Field of Search ............................... 360/106, 97.01

[56] References Cited

U.S. PATENT DOCUMENTS

| | | | |
|---|---|---|---|
| 5,025,335 | 6/1991 | Stefansky | 360/137 |
| 5,034,837 | 7/1991 | Schmitz | 360/106 X |
| 5,109,310 | 4/1992 | Ohkjita | 360/106 |

*Primary Examiner*—A. J. Heinz
*Attorney, Agent, or Firm*—Cushman, Darby & Cushman

[57] ABSTRACT

A magnetic disk apparatus includes a base on which a spindle motor for rotating a magnetic disk and a carriage supporting a magnetic head are mounted. A voice coil motor for rotating the carriage is mounted on the base. The voice coil motor includes a bottom yoke, a top yoke facing the bottom yoke with a gap, a magnet fixed to the top yoke to face the bottom yoke, and a coil fixed to the carriage. The base is formed integrally with the bottom yoke by insert molding. The bottom yoke is partially buried in the base and its upper surface is exposed to the outside the base. The bottom yoke has tapped holes, and the top yoke with the magnet is fixed to the bottom yoke by screwing screws into the tapped holes via through holes bored in the top yoke.

14 Claims, 3 Drawing Sheets

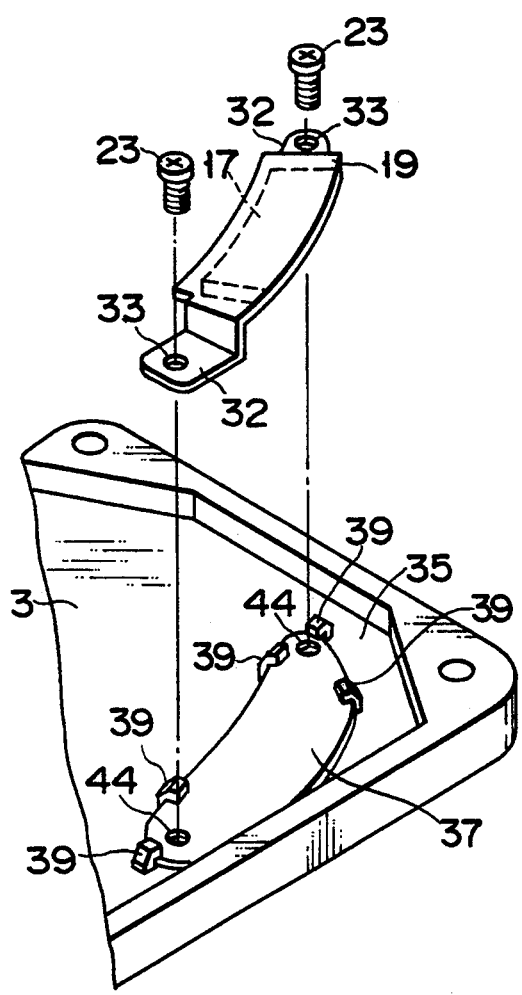
F I G. 4
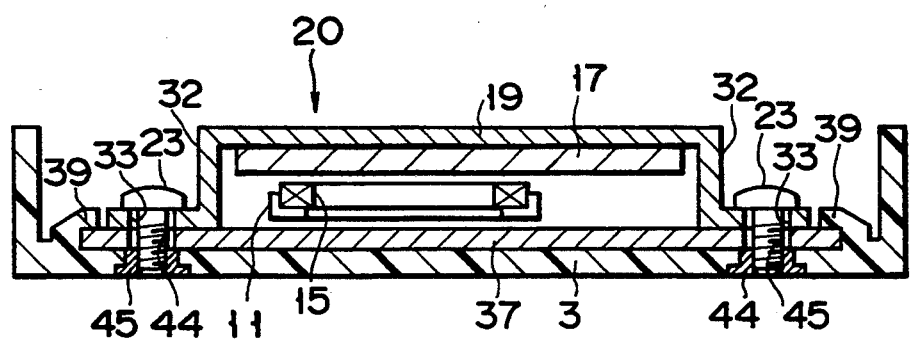
F I G. 5

MAGNETIC DISK APPARATUS AND METHOD FOR MANUFACTURING THE SAME

This is a continuation of application Ser. No. 07/753,082, filed on Aug. 30, 1991, now abandoned.

BACKGROUND OF THE INVENTION

1. Field of the Invention

The present invention relates to a magnetic disk apparatus, and more particularly, to a magnetic disk apparatus provided with a rotatable carriage supporting a magnetic head and a drive section for rotating the carriage, and a method for manufacturing the same.

2. Description of the Related Art

In general, a magnetic disk apparatus of a rotary actuator type comprises a housing formed by die casting aluminum or the like. A spindle motor, having a magnetic disk on its rotating shaft, and a carriage supporting a magnetic head are mounted on the bottom wall of the housing. The carriage, which is rotatably supported by means of a pivot shaft set up on the bottom wall of the housing, is rotated by of a voice coil motor for use as a drive source. The magnetic head is rotated together with the carriage, and moved onto a desired information track of the magnetic disk.

The voice coil motor generally includes a bottom yoke and a permanent magnet facing at a predetermined distance from each other, a top yoke which supports the magnet and forms a magnetic circuit in conjunction with the bottom yoke, and a coil fixed to that end portion of the carriage on the opposite side of the pivot shaft to the magnetic head. The coil is situated between the bottom yoke and the magnet with fixed gaps between them. when a predetermined control current is caused to flow through the coil, the carriage is rotated around the pivot shaft by an interaction of magnetic fluxes produced individually by the coil and the permanent magnet.

Conventionally, the bottom and top yokes are fixed on the bottom wall of the housing in the following manner. A mounting surface is formed in a predetermined position on the bottom wall of the housing, and the bottom yoke in the form of a plate is mounted on the mounting surface. The mounting surface is planed, in order to prevent looseness of the bottom yoke and position it accurately with respect to the coil on the carriage. A pair of tapped holes are formed individually at the end portions of the mounting surface, and a pair of through holes aligned individually with these tapped holes are formed in the bottom yoke. The top yoke is a plate member whose opposite end portions are bent toward the bottom wall of the housing, thus forming legs. These legs, which rest on the bottom yoke, each have a mounting hole aligned with each corresponding tapped hole. The top and bottom yokes are fixed together to the bottom wall of the housing by screwing fixing screws into the tapped holes through the mounting holes of the top yoke and the through holes of the bottom yoke.

In the conventional apparatus described above, however, the manufacture of the housing requires a process for planing the mounting surface and a tapping process for forming the tapped holes, and these mechanical processes constitute a hindrance to the improvement of productivity.

SUMMARY OF THE INVENTION

The present invention has been contrived in consideration of these circumstances, and its object is to provide a magnetic disk apparatus and a method for manufacturing the same, in which machining the bottom wall of a housing requires fewer processes, so that the productivity can be improved.

In order to achieve the above object, according to the present invention, a bottom yoke of drive means is formed integrally with a housing by insert molding. Therefore, a mounting surface for mounting the bottom yoke on the housing and tapped holes need not be machined, so that machining processes can be reduced in number, and the productivity of the apparatus can be improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 to 3 show a magnetic disk apparatus according to a first embodiment of the present invention, in which;

FIG. 1 is a plan view generally showing the apparatus with its cover off;

FIG. 2 is an exploded perspective view showing the way yokes are mounted;

FIG. 3 is a sectional view taken along line III—III of FIG. 1; and

FIGS. 4 and 5 show a magnetic disk apparatus according to a second embodiment of the invention, in which FIG. 4 is a perspective view similar to that of FIG. 2; and FIG. 5 is a sectional view similar to that of FIG. 3.

DETAILED DESCRIPTION OF THE PREFERRED EMBODIMENTS

Preferred embodiments of the present invention will now be described in detail with reference to the accompanying drawings.

Figure 1:
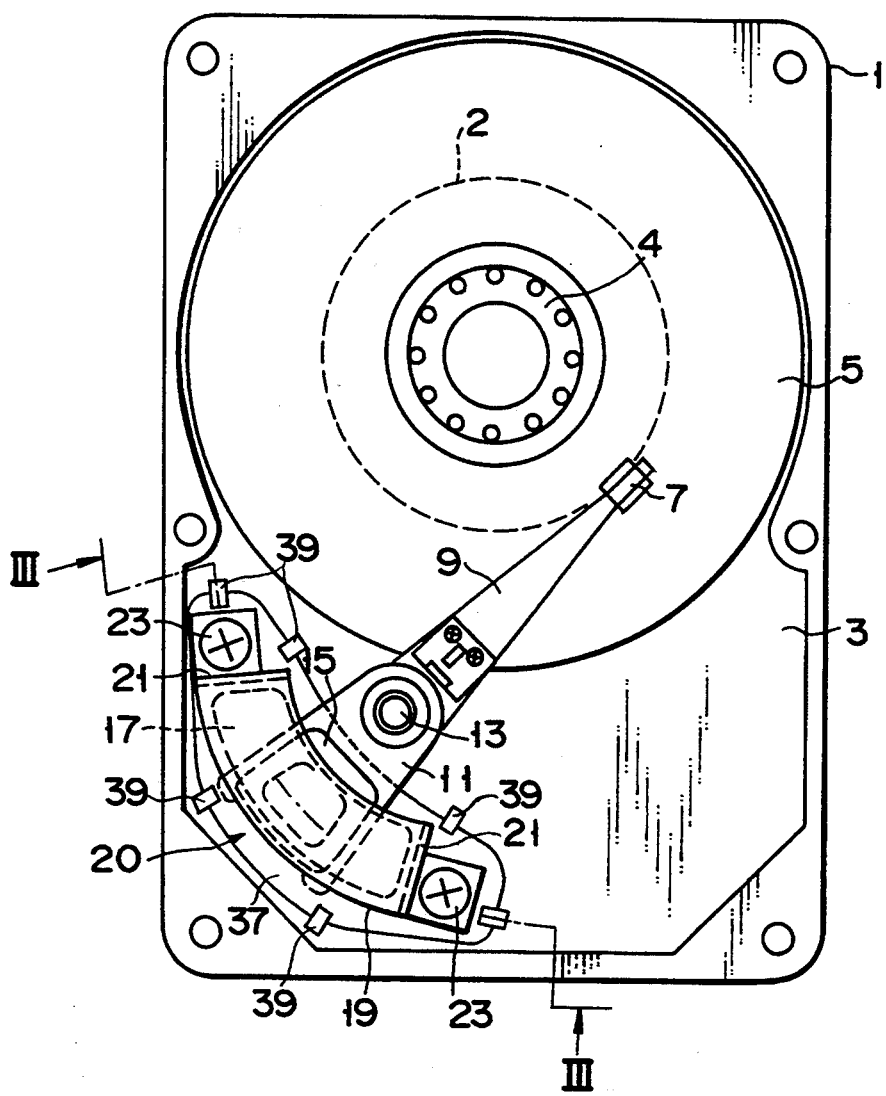

FIG. 1 shows a magnetic disk apparatus of a rotary actuator type with its cover off.

The magnetic disk apparatus comprises a housing 1 which is integrally formed of a synthetic resin, for example, polycarbonate. The housing 1 includes a substantially rectangular bottom wall 3, which serves as a base, and side walls set up individually on the side edges of the bottom wall. A copper leaf (not shown) for electromagnetically shielding the interior of the housing 1 is pasted on the inner surface of the housing. A spindle motor 2 is fixed on the bottom wall 3, and a magnetic disk 5 is mounted on a spindle shaft 4 of the motor. A pivot shaft 13 is set up on the bottom wall 3, and a carriage 11 is supported on the shaft 13 so as to be rotatable within a plane parallel to the disk 5. The carriage 11 includes a suspension 9 which is formed of a leaf spring extending from the vicinity of the pivot 13 and overhanging the disk 9. A magnetic head 7 is mounted on the extended end of the suspension 9. As the carriage 11 rotates, the head 7 moves on the disk 5 substantially in the radial direction thereof. As the disk 5 rotates during the operation of the apparatus, the magnetic head 7 reads or writes information on or from the disk in a manner such that it is kept narrowly above the disk surface.

A coil 15, which constitutes part of a voice coil motor 20 (mentioned later), is fixed to that end portion of the carriage 11 on the opposite side of the shaft 13 to the magnetic head 7. The coil 15 is wound around an axis perpendicular to the bottom wall 3.

Figure 2:
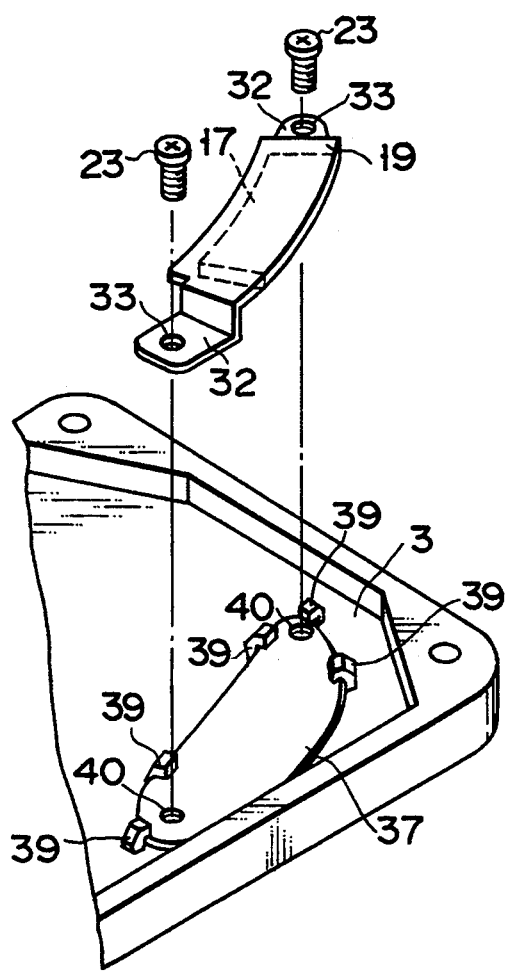
Figure 3:
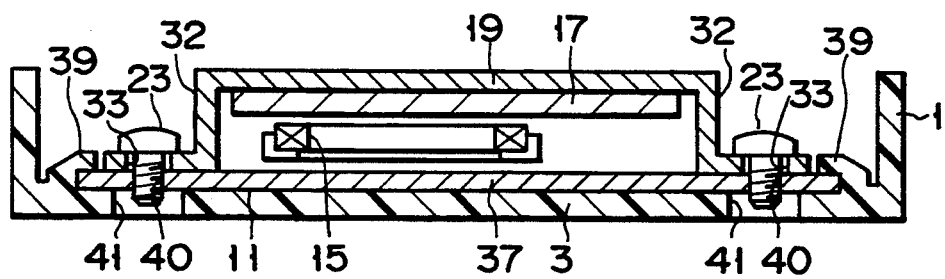

The voice coil motor 20 is mounted on the bottom wall 3 of the housing 1. It serves as drive means for rotating the carriage 11. As shown in FIGS. 1 to 3, the motor 20 includes a top yoke 19, a planar permanent magnet 17 fixed to the inside of the top yoke, a bottom yoke 37, and the coil 15. The coil 15 is situated between the magnet 17 and the bottom yoke 37 with fixed gaps between them.

The bottom yoke 37 is formed integrally with the housing 1 by insert molding. More specifically, the yoke 37 is a plate member formed from a magnetic material, and the housing 1 is molded from polycarbonate in a manner such that the yoke 37, a separate body, is inserted therein. In the combined state, the yoke 37 is situated substantially parallel to the bottom wall 3 of the housing 1. In this state, the lower portion of the yoke 37 is buried in the bottom wall 3, while the upper portion is exposed to the outside of the wall 3. The bottom wall 3 includes six fixing hooks 39 protruding individually from six points thereof situated along the peripheral edge of the bottom yoke 37. The hooks 39, which are integrally formed when the housing 1 is molded, engage the upper surface of the yoke 37. Thus, the yoke 37 is firmly fixed in a predetermined position on the bottom wall 3 without looseness, in a manner such that its lower portion is buried in the bottom wall and that it is held by means of the hooks 39. A pair of tapped holes 40 are previously formed in the yoke 37 before the insert molding.

The top yoke 19 is a plate member whose opposite end portions are bent L-shaped, thus forming a pair of legs 32. The yoke 19 faces the bottom yoke 37 at a predetermined distance therefrom in parallel relation while its leg 32 rest on the yoke 37. Each leg 32 has a through hole 33 which is aligned with its corresponding tapped hole 40 of the bottom yoke 37. The top yoke 19 is fixed to the bottom yoke 37 by screwing fixing screws 23 into their corresponding tapped holes 40 through the through holes 33. These yokes 19 and 37 constitute a magnetic circuit. Through holes 41 to receive the respective tip end portions of the screws 23 are formed in the bottom wall 3, individually in alignment with the tapped holes 40. The holes 41 are formed during the insert molding of the housing 1.

The permanent magnet 17, which is in the form of a plate having substantially the same shape as the top yoke 19, is fixed to the inner surface of the yoke 19. Thus, the magnet 17 faces the bottom yoke 37 at a predetermined distance therefrom in parallel relation.

The coil 15, which is fixed to the carriage 11, is situated between the bottom yoke 37 and the permanent magnet 17 with the fixed gaps between them. When a predetermined control current is caused to flow through the coil 15, the carriage 11 is rotated around the pivot shaft 13 by an interaction of magnetic fluxes produced individually by the coil 15 and the magnet 17. Thus, the magnetic head 7 is moved onto a desired information track of the magnetic disk 5 and positioned. As the carriage 11 rotates in this manner, the coil 15 moves between the yoke 37 and the magnet 17.

According to the magnetic disk apparatus constructed in this manner, the housing 1 is formed integrally with the bottom yoke 37 by insert molding, so that the molded housing need not be planed or tapped for the attachment of the bottom yoke. Thus, the manufacture of the housing is so easy that the productivity of the apparatus can be improved, and the manufacturing cost can be reduced. Further, those members which constitute the voice coil motor 20 can be attached to the housing 1 by only screwing the top yoke 19 with the permanent magnet 17 thereon to the bottom yoke 37 by means of the fixing screws 23, so that the assembling efficiency of the apparatus is improved. Since the housing 1 is formed of synthetic resin, moreover, the overall weight of the apparatus can be reduced.

FIGS. 4 and 5 show the principal part of a magnetic disk apparatus according to a second embodiment of the present invention.

In FIGS. 4 and 5, like reference numerals are used to designate the same portions as in the foregoing embodiment, and a detailed description of those portions is omitted.

A housing 1 is formed integrally with a bottom yoke 37 by insert molding. The yoke 37 is fixed to a bottom wall 3 in a manner such that its lower portion is buried in the bottom wall and that it is held by means of fixing hooks 39. A through hole 44 is previously formed in each end portion of the yoke 37. The paired holes 44 are aligned individually with through holes 33 which are formed individually in a pair of legs 32 of a top yoke 19. A pair of nuts 45 are embedded integrally in the bottom wall 3 by insert molding, individually in alignment with the through holes 44 of the yoke 37.

According to the second embodiment, the top yoke 19 is attached to the bottom yoke 37 by screwing the fixing screws 23 into their corresponding nuts 45 through the through holes 33 and 44 in a manner such that the holes 44 of the yoke 37 are individually in alignment with the holes 33 of the yoke 19.

Also in the second embodiment arrangement in this manner, the housing 1 is formed integrally with the bottom yoke 37 and the nuts 45 by insert molding, so that machining processes for the housing can be reduced in number, and therefore, the productivity of the apparatus can be improved, and the manufacturing cost can be reduced. Moreover, those members which constitute the voice coil motor 20 can be attached to the housing 1 by only screwing the top yoke 19 to the bottom yoke 37, so that the assembling efficiency of the apparatus is improved. According to this embodiment, furthermore, the nuts 45 are embedded integrally in the housing 1, so that the bottom yoke 37 need not be tapped. Thus, the productivity of the apparatus can be further improved.

It is to be understood that the present invention is not limited to the embodiments described above, and that various changes and modifications may be effected therein by one skilled in the art without departing from the scope or spirit of the invention.

For example, the housing is not limited to the one formed by insert-molding the synthetic resin, and may alternatively be formed by die-casting metal, such as aluminum, so that the bottom yoke and the nuts are integrally embedded.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A magnetic disk apparatus comprising:
   a base;
   a magnetic recording medium;
   rotating means, mounted on the base for rotating the recording medium;
   supporting means, rotatably mounted on the base, for supporting a magnetic head for information processing on the recording medium; and
   drive means for rotating the supporting means, the drive means including:
   a first yoke formed integral to and partially disposed within the base, the base being formed from synthetic resin,
   a second yoke disposed opposite to the first yoke at a predetermined distance therefrom,
   a magnet fixed to one of the first and second yokes and being opposite to the other yoke, and
   a coil mounted on the supporting means and disposed between the magnet and the other yoke.

2. An apparatus according to claim 1, wherein said first yoke is in the form of a plate having a bottom surface disposed within the base and an upper surface exposed from the base, and said second yoke is mounted on the upper surface of the first yoke.

3. An apparatus according to claim 2, wherein said base includes integral hooks engaged with the upper surface of the first yoke.

4. An apparatus according to claim 3, wherein said first yoke has tapped-holes, and said second yoke has through-holes aligned individually with the tapped-holes and is fixed to the first yoke by screws screwed into the corresponding tapped-holes through the through-holes.

5. An apparatus according to claim 4, wherein said base has through-holes aligned individually with the tapped-holes for receiving the screws.

6. An apparatus according to claim 3, wherein said first yoke has first through-holes, said base includes nuts embedded in the base so as to be in alignment with the first through-holes, and said second yoke has second through-holes aligned individually with the first through-holes and is fixed to the first yoke by means of screws screwed into the corresponding nuts through the first and second through-holes.

7. A magnetic disk apparatus comprising:
   a base;
   a magnetic recording medium;
   rotating means, mounted on the base, for rotating the recording medium;
   supporting means, rotatably mounted on the base, for supporting a magnetic head for information processing on the recording medium; and
   drive means for rotating the supporting means, the drive means including:
   a first yoke formed integral to and partially disposed within the base, the first yoke having a bottom surface disposed within the base and having an upper surface exposed from the base, the base having integral hooks engaging the upper surface of the first yoke,
   a second yoke mounted on the upper surface of the first yoke,
   a magnet fixed to one of the first and second yokes and being opposite to the other yoke, and
   a coil mounted on the supporting means and disposed between the magnet and the other yoke.

8. An apparatus according to claim 7, wherein said base is formed from metal whereby the first yoke is inserted into the base.

9. A method for manufacturing a magnetic disk apparatus which comprises rotating means, disposed on a base, for rotating a recording medium, supporting means, rotatably mounted on the base, for supporting a magnetic head for information processing on the recording medium, and drive means for rotating the supporting means, the drive means including a first yoke and a second yoke, the method comprising the steps of:
   preparing the first yoke in the form of a plate;
   forming the base integrally with the first yoke, the first yoke being partially disposed within the base, the base being formed of a synthetic resin; and
   fixing the second yoke to the first yoke.

10. A method according to claim 9, wherein said step of preparing includes forming tapped-holes in the first yoke.

11. A method according to claim 10, wherein said step of fixing includes placing the second yoke on the first yoke and screwing screws into the tapped-holes via through-holes formed in the second yoke.

12. A method according to claim 11, wherein said step of fixing includes forming the through-holes aligned individually with the tapped-holes, for receiving the screws.

13. A method according to claim 9, wherein said step of preparing includes forming first through-holes in the first yoke, and said step of forming the base includes inserting nuts in alignment with the first through-holes.

14. A method according to claim 13, wherein said step of fixing includes placing the second yoke on the first yoke, and screwing screws into the nuts via second through holes formed in the second yoke and the first through holes corresponding thereto.

* * * * *